Patented Feb. 24, 1925.

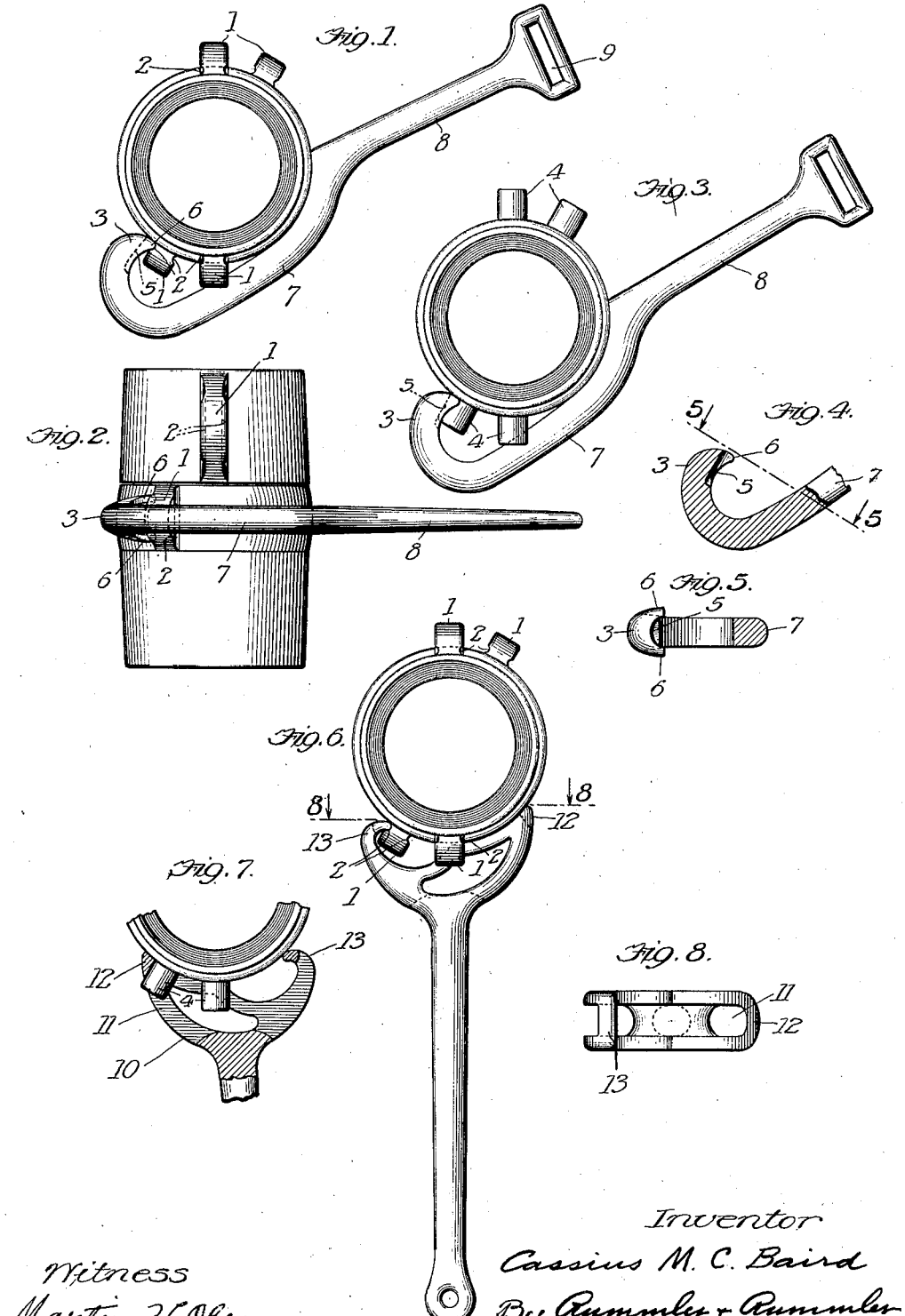

1,527,772

UNITED STATES PATENT OFFICE.

CASSIUS M. CLAY BAIRD, OF CHICAGO, ILLINOIS.

FIREMAN'S SPANNER.

Application filed April 21, 1924. Serial No. 708,004.

*To all whom it may concern:*

Be it known that I, CASSIUS M. CLAY BAIRD, a citizen of the United States of America, and a resident of Chicago, in the county of Cook and State of Illinois, have invented a new and useful Improvement in Firemen's Spanners, of which the following is a specification.

This invention relates to spanners for operating the couplings of fire hose, and the object of the invention is to provide an improved spanner suitable for engagement with both the common cylindrical type of lug on couplings and an improved form of lug which is curved in the direction of length of the hose in order to properly ride over projecting sills, etc.

The objects of the invention are accomplished by the device shown in the drawing in which—

Figure 1 is an end view of a hose coupling with the spanner applied thereto.

Fig. 2 is a plan view of the coupling and spanner.

Fig. 3 is an end view of a coupling provided with cylindrical lugs and having the spanner applied thereto.

Fig. 4 is a sectional detail illustrating the form of the claws or lug-engaging part of the spanner.

Fig. 5 is a sectional detail taken on the line 5—5 of Fig. 4.

Fig. 6 is an end view of a coupling and shows applied thereto a different form of spanner having the improved claw.

Fig. 7 is a detail illustrating the type of spanner shown in Fig. 6 in longitudinal section but with the spanner applied to a cylindrical lug rather than the convex type of lug shown in Fig. 6.

Fig. 8 is an end view of the spanner shown in Fig. 6.

It is desirable that spanners for fire hose couplings should be as light as possible, consistent with ample strength and also formed to serve as a hook for engaging the ladder rungs, the opposite end of each spanner having an eye by means of which it may be strapped to the hose. The construction shown in Figs. 1–5 fulfills these requirements, while it is also well formed for coaction with different types of lugs with which the couplings are provided. Figs. 1 and 3 show hose couplings with the different lugs. The lug 1 shown in Fig. 1, also in Fig. 2, extends in the direction of length of the coupling and is suitably curved on its periphery to ride over projecting shoulders when the hose is drawn or laid out. The lugs 1 are recessed or under-cut at 2 in order to securely receive the claw 3 of the spanner. The cylindrical type of lug 4 shown in Fig. 3 will fit a curved recess or concave seat 5 in the claw between the spreading prongs 6 of the spanner, as indicated in Fig. 5. This curved recess 5 extends in the direction of lugs 4 radially of the coupling when the spanner is in operating position.

The hose coupling engaging part 7 of the spanner is off-set from the straight handle 8 as is necessary for the claw 3 to encircle the coupling lugs, and to provide a curved shoulder 8 to engage the body of the coupling and to cause part of the coupling to rotate with the spanner as a unit. The eye of the end of the handle 8 is for the reception of a strap.

The type of spanner shown in Figs. 6–8 is much used in connection with couplings having cylindrical lugs, but as herein shown, is modified so as to be suitable for the lug shown in Figs. 1 and 2. This form of spanner is provided with a semi-circular head 10 to fit the coupling and is hollowed out at 11 to receive the coupling lug. The coupling lug is engaged by a shoulder 12 extending between the sides of the operating head of the spanner. This spanner is now modified at one side in order to provide it with a claw 13 suitable for engaging the recess 2 in the form of lug 1.

I claim:

1. A spanner of the class described comprising a handle, and a hose coupling engaging part off-set from said handle to provide a curved shoulder adjacent the handle and an opposed inwardly extending claw at the end of the coupling engaging part, said claw being provided with a concave seat which will extend radially of the coupling when the spanner is in working position.

2. A spanner of the class described comprising a handle, and a hose coupling engaging part off-set from said handle to provide a curved shoulder adjacent the handle and an opposed inwardly extending claw at the end of the coupling engaging part, said claw spreading towards its end and being provided with a concave seat which will extend radially of the coupling when the spanner is in working position.

Signed at Chicago this 17 day of April, 1924.

CASSIUS M. CLAY BAIRD.